(12) United States Patent
Patterson

(10) Patent No.: US 7,786,186 B2
(45) Date of Patent: Aug. 31, 2010

(54) OPTICALLY TRANSPARENT POLYMER WITH ANTIBIOFOULING PROPERTIES

(75) Inventor: Donald E. Patterson, Austin, TX (US)

(73) Assignee: Nanohmics, Inc., Austin, TX (US)

( * ) Notice: Subject to any disclaimer, the term of this patent is extended or adjusted under 35 U.S.C. 154(b) by 745 days.

(21) Appl. No.: 11/705,357

(22) Filed: Feb. 12, 2007

(65) Prior Publication Data
US 2008/0194732 A1    Aug. 14, 2008

(51) Int. Cl.
*C09D 5/16* (2006.01)
*C08K 5/105* (2006.01)

(52) U.S. Cl. .................. 523/122; 524/100; 524/225

(58) Field of Classification Search ............... 523/122; 524/100, 225
See application file for complete search history.

(56) References Cited

U.S. PATENT DOCUMENTS

| | | | |
|---|---|---|---|
| 4,405,360 A | 9/1983 | Cardarelli | |
| 5,397,385 A | 3/1995 | Watts | |
| 5,652,027 A | 7/1997 | Brady, Jr. et al. | |
| 5,698,191 A | 12/1997 | Wiersma et al. | |
| 5,925,370 A | 7/1999 | Bullat et al. | |
| 5,990,043 A | 11/1999 | Kugler et al. | |
| 6,096,430 A | 8/2000 | Brady, Jr. et al. | |
| 6,258,918 B1 * | 7/2001 | Ho et al. | 528/66 |
| 6,410,622 B1 | 6/2002 | Endres | |
| 6,607,826 B1 | 8/2003 | Hatch | |
| 6,608,129 B1 | 8/2003 | Kloski et al. | |
| 6,635,692 B1 | 10/2003 | Christie et al. | |
| 6,710,117 B2 | 3/2004 | Gillard et al. | |
| 6,925,952 B1 | 8/2005 | Popovic | |

OTHER PUBLICATIONS

A.Kerr, M.J. Smith, M.J. Cowling, T.Hodgkiess; "The biofouling resistant properties of six trans . . . "; Materials & Design vol. 22 (2001); pp. 383-392; Elsevier Science Ltd.

* cited by examiner

*Primary Examiner*—Kriellion A Sanders
(74) *Attorney, Agent, or Firm*—Claude E. Cooke, Jr.; Burleson Cooke L.L.P.

(57) ABSTRACT

Optically transparent, impact-resistant solid polymer bodies are provided that are resistant to fouling by organisms such as algae, bacteria and molds. The bodies may be sheets of polymer for use as covers for optical sensors, windows or other cover glasses. The materials may be formed by solvent casting, extrusion or other processing methods.

14 Claims, 5 Drawing Sheets

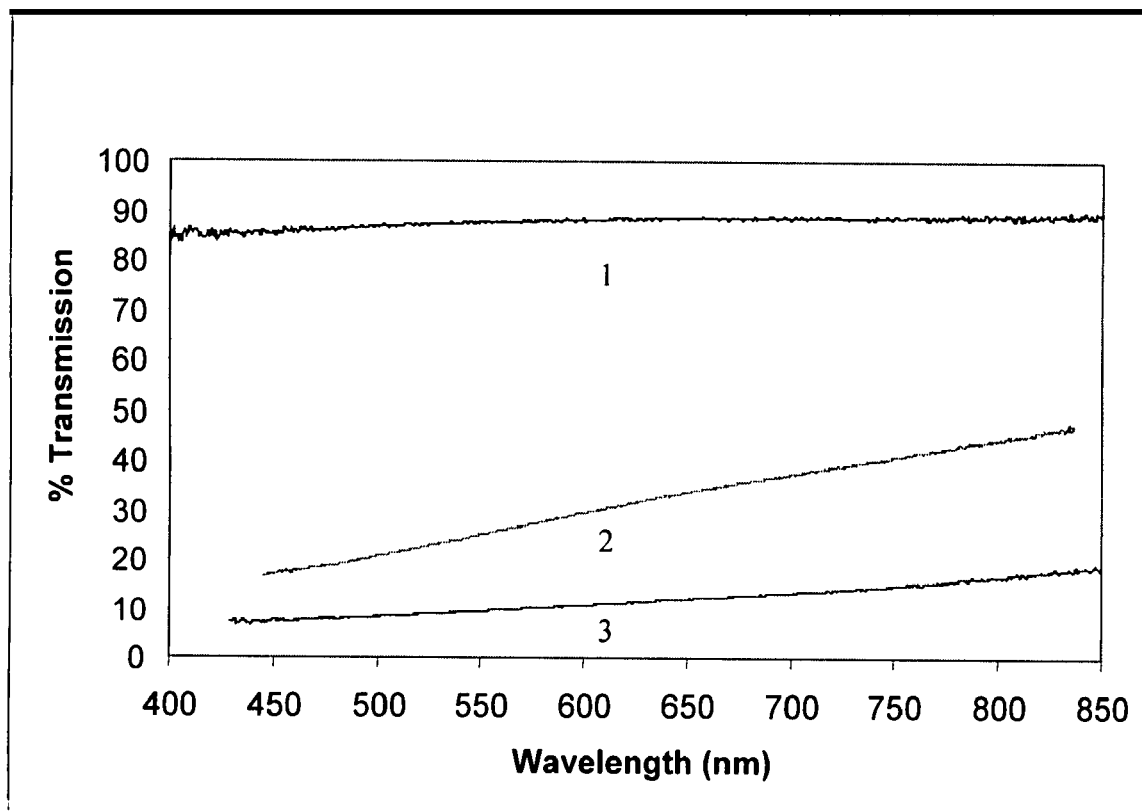
FIG. 1 Polycarbonate with Capsaicin

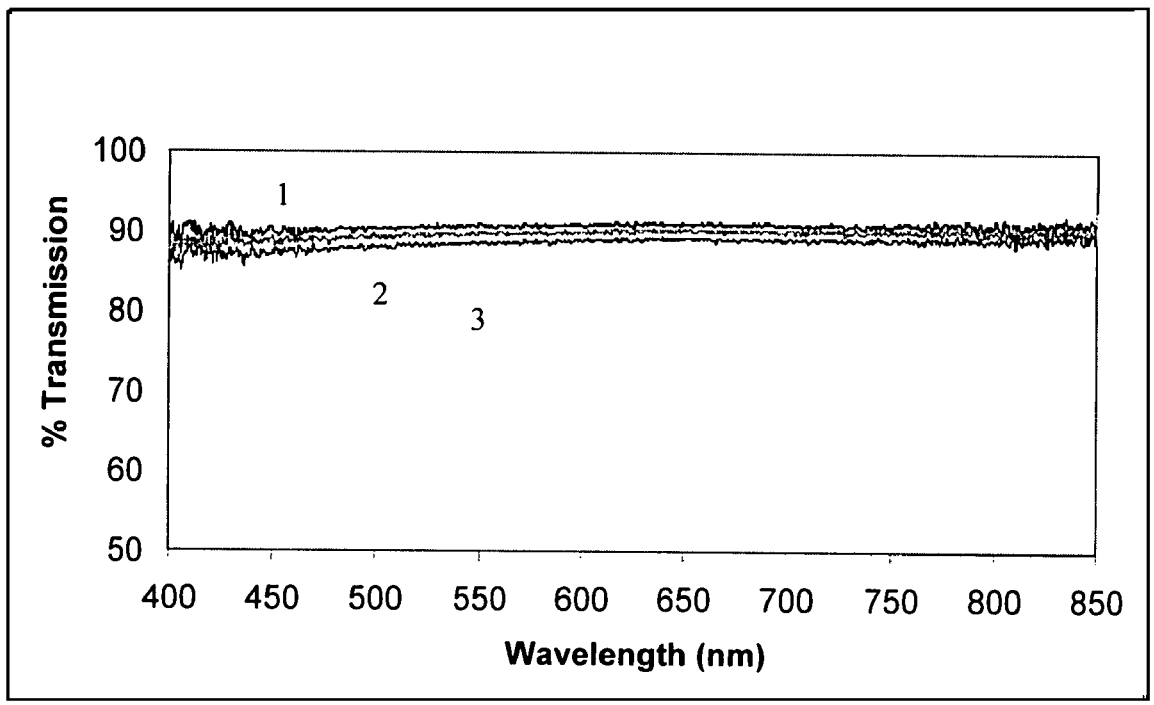
FIG. 2 Polymethylmethacrylate with Capsaicin

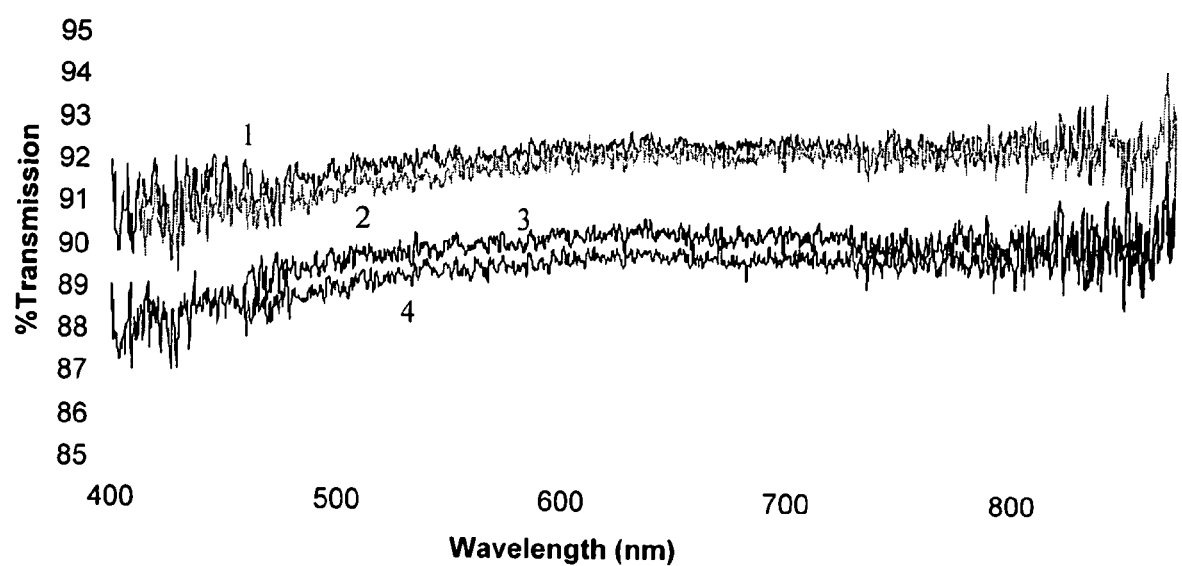
FIG. 3 Transmission of Diuron/PMMA Coverglass

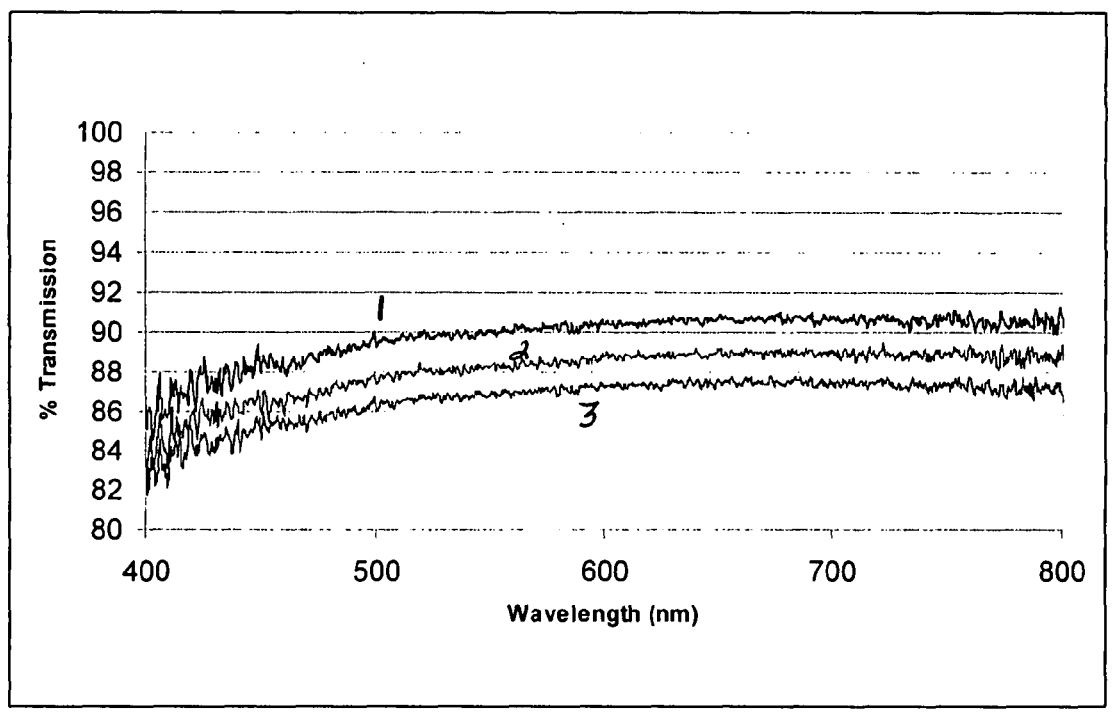
FIG. 4 Optical Transmission of Irgarol/PMMA Coverglass

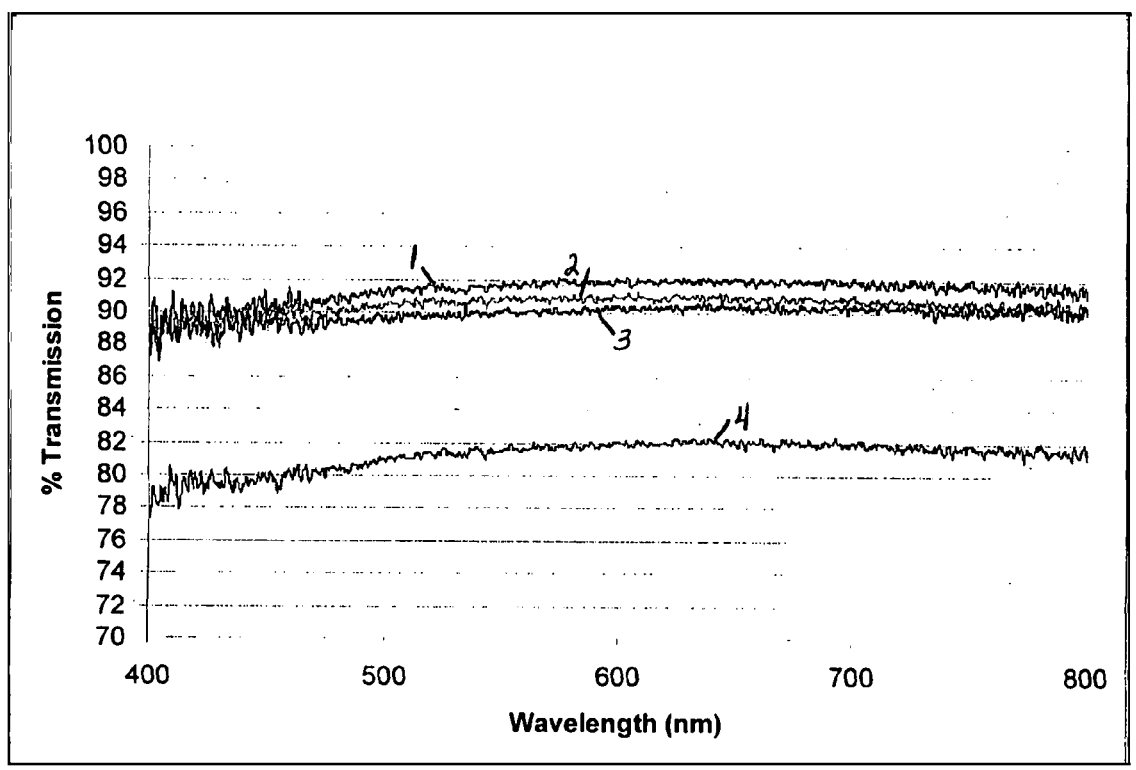
FIG. 5 Diuron/PMMA Coverglass After Algae Growth

OPTICALLY TRANSPARENT POLYMER WITH ANTIBIOFOULING PROPERTIES

BACKGROUND OF INVENTION

1. Field of the Invention

This invention pertains to transparent bodies formed from polymers. More particularly, compositions and methods for forming are provided for transparent polymer bodies that are resistant to fouling by algae and other organisms.

2. Description of Related Art

Solid, impact-resistant, optically transparent materials are used as covers for remote optical sensors, cameras, and other instruments employed for monitoring conditions in marine and freshwater environments. The covers are used to isolate the instruments from the environment while allowing sensing of light. The sensors may be in place for extended periods of time and should be maintenance-free. To achieve this goal, the transparent materials used as covers need to resist or eliminate biofouling (unwanted attachment of biological organisms to the surface of the transparent material). Biofouling may be caused by algae, bacteria, mold, and other biological agents. Other potential applications of solid transparent materials that are resistant to biofouling include aquarium windows, greenhouse glass, and building glazing material. All such materials used to transmit light are referred to herein as "coverglasses."

An antifouling (AF) agent is defined here as a chemical compound that prevents the growth of organisms on the surface where the agent is present. Ideally, the AF agent is environmentally benign. In less-than-ideal cases, a suitable AF must degrade rapidly in a neighboring environment and/or have controlled release partitioning in the environment resulting in limited bio-availability to other organisms. Use of an AF agent must result in minimal accumulation of toxic compounds (i.e., toxic antifoulants must chemically degrade rapidly in the environment) and the AF agent must have limited toxicity to organisms in the local environment surrounding the protected object at concentrations that are effective at providing antifouling action. The primary marine AFs used extensively over the past several decades have been in the family of organotins. Chief among these are the tributyltin (TBT) compounds. While these compounds were extremely effective as antifoulants, they have proven to be too toxic and too long-lived. As a result, TBTs were outlawed by the International Maritime Organization effective Jan. 1, 2003.

Less toxic marine AF alternatives have since been approved and put into use. These include: various copper compounds (copper (I) oxide, copper thiocyanate, metallic copper, copper bronze, copper napthenate, and other copper compounds), SeaNine 211 (4,5-dichloro-2-moctyl-4-isothiaz-olin-3-one; Rohm and Haas), Irgarol® 1051 algaecide (N-(tert-butyl)-N'-cyclopropyl-6-(methylthio)-1,3,5-triazine-2,4-diamine; Ciba Specialty Chemical), and Diuron (3-(3,4-dichlorophenyl)-1,1-dimethylurea; DuPont Chemical). While all of these materials are attractive as being more environmentally-friendly than TBT, they still are not completely environmentally benign.

A new class of antifoulants—natural product antifoulants (NPA)—is gaining more attention and use. The most studied NPAs are capsaicin (the principal "hot" ingredient in peppers) and zosteric acid (ZA, ρ-coumaric acid sulfate, a naturally occurring phenolic acid found in eel grass). Both of these compounds have shown good antifouling properties, particularly against marine animals. In previous antifouling studies, NPAs have been placed into various compounds including paints, silicone, and polystyrene. It has been shown in head-to-head comparisons that capsaicin displays more effective antifouling properties than zosteric acid. However, due to its molecular structure, capsaicin is able to leach out of an encapsulating matrix more quickly into the environment. As a result, the lifetime of protective layers which incorporate capsaicin into the matrix are shorter than that observed with zosteric acid.

Antibiofouling agents have been added to polymers, paints, films and laminates. For example, U.S. Pat. No. 6,607,826 discloses a plastic anti-fouling film for boat hull protection. Transparent materials have also had metal- and non-metal-based antifoulants placed on them as protective films; however, these materials are protective coatings and are not distributed throughout the whole window or coverglass material.

U.S. Pat. No. 6,608,129 discloses a polymer matrix having "natural free volume" in which is placed inorganic or organic materials that may be antifouling. A composite or surface layer is formed. The polymer is evacuated before the polymer is exposed to the active antifoulant material, which may polymerize or react with the polymer. The disclosed polymers were not designed to be transparent to light nor were they designed to be impact resistant.

U.S. Pat. No. 6,635,692 discloses extruded polymers incorporating antifouling agents, including organic biocides. Antifoulant release from different types of polymers and from polymers with different antifoulant loadings is reported in the patent. The polymers were extruded as narrow sheets using a counter-rotation twin screw extruder fitted with a slit die. The disclosed polymers were not designed to be transparent to light nor were they designed to be impact resistant.

Immersion of transparent polymers in surfactant solutions was also found to decrease growth of bacteria. (Kerr, A., et al, 'The Biofouling Resistant Properties of Six Transparent Polymers with and without Pre-treatment by Two Antimicrobial Solutions," *Materials and Design,* Vol. 22, pp 383-392, June 2001) This treatment is a coating on the polymers and is not a biocide nor is it distributed throughout the polymer system.

What is needed is a transparent polymer having good impact resistance that can be made resistive to fouling organisms without significantly reducing the optical transmission of the polymer. The material providing the fouling resistance should not leach into an environment to an extent that causes environmental concerns.

BRIEF SUMMARY OF INVENTION

Impact resistant, transparent polymer bodies that resist fouling by organisms are provided. A mixture of polymer and an organic antifoulant compound or mixture of compounds is formed by solvent or thermal polymer processing methods. The antifoulant may be an algaecide, biocide, herbicide, or pesticide. Mixtures of two or more antifoulants may be prepared.

BRIEF DESCRIPTION OF DRAWINGS

FIG. 1 is a graph of percent optical transmission of a mixture of capsaicin in polycarbonate at different concentrations of capsaicin.

FIG. 2 is a graph of percent optical transmission of a mixture of capsaicin in polymethylmethacrylate (PMMA) at different concentrations of capsaicin.

FIG. 3 is a graph of percent optical transmission of a mixture of Diuron in PMMA at different concentrations of Diuron.

FIG. 4 is a graph of percent optical transmission of a mixture of Irgarol® in PMMA at different concentrations of Irgarol®.

FIG. 5 is a graph of percent optical transmission of a mixture of Diuron in PMMA at different concentrations of Diuron after growth of algae on the sample.

DETAILED DESCRIPTION OF THE INVENTION

The material disclosed herein is a mixture of an antibiofouling agent and a hard, impact resistant, optically transparent polymer that is formed into a desired shape. A plurality of antifoulants may be combined to form a mixture of antifouling agents in the polymer, which may be selected for different types of biofoulants. The shape is usually a sheet or plate having parallel sides and a thickness in the range from about 0.01 mm to several centimeters. The AF agents must be chosen and incorporated so that they do not excessively decrease transmission of light through the polymer. This normally means that they must form a solid solution in the polymer, as opposed to a suspension. Common anti-biofoulants include, but are not limited to algaecides, herbicides, bactericides, and pesticides. These materials may be synthesized (e.g. urea-based algaecides, glyphosates (herbicide), fluoroquinolones (bactericide), copper oxides, etc.), or they may be naturally occurring (e.g., capsaicin, zosteric acid, etc.). The antibiofoulants must be stable at the processing conditions of the polymer. The common impact-resistant, optically transparent plastics suitable for use include, but are not limited to, polymethylmethacrylate (PMMA), polycarbonates, and polyterephthalates. The molecular structures of these polymers are:

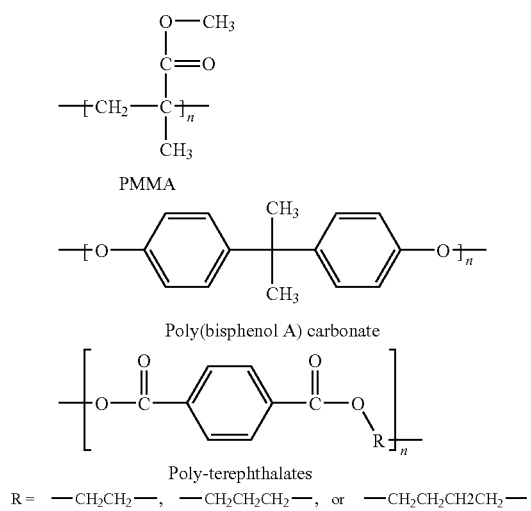

PMMA

Poly(bisphenol A) carbonate

Poly-terephthalates

R = —CH$_2$CH$_2$—,  —CH$_2$CH$_2$CH$_2$—, or  —CH$_2$CH$_2$CH$_2$CH$_2$—

A selected quantity of anti-biofoulant that is sufficient to have biological activity but that will not excessively decrease transmission of light through the polymer is added to the polymer before the polymer is formed into the final shape for use. The mixture of antifoulant and polymer is then formed into a final shape by any common means including solvent casting, injection molding, sheet extrusion, and heat casting. The final product preferably has optical transparency greater than 70%, good mechanical properties (high impact strength), the ability to inhibit biological fouling, a low leach rate of the antibiofoulants into the environment, and an antifoulant that does not have long-term stability in the environment after it leaches out of the polymer.

Three impact-resistant, optically transparent (>70% transmission between 400 and 800 nm) polymers were tested for at least some of the important properties: polymethylmethacrylate (PMMA), poly(bisphenol-A) carbonate (polycarbonate; PC), and a copolymer of cis/trans 2,2,4,4-tetramethyl-1,3-cyclobutanediol (CBDO), 1,3-propanediol, and dimethyl-terephthalate(terephthalate). One or a mixture of the above polymers may be mixed with an anti-biofouling agent that will produce the desired protection. The anti-biofoulants may be chosen from an algaecide, bactericide, herbicide, pesticide, pest repellant, or mixture of any of these compounds that is stable at processing conditions and that does not excessively decrease transmission of light through the polymer or damage the polymers' physical and mechanical properties to any appreciable extent. Algaecides tested included Diuron (3-(3,4-dichlorophenyl)-1,1-dimethylurea), a product of DuPont Chemicals and Irgarol® 1051 (N-(tert-butyl)-N'-cyclopropyl-6-(methylthio)-1,3,5-triazine-2,4-diamine), a product of Ciba Specialty Chemicals. The structures of these algaecides are:

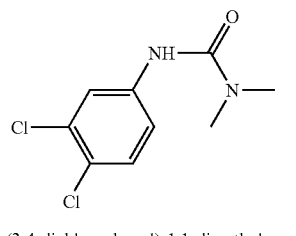

3-(3,4-dichlorophenyl)-1,1-dimethylurea

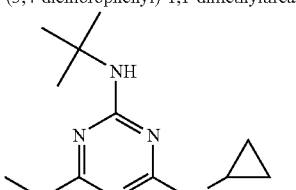

N-(tert-butyl)-N'-cyclopropyl-6-
(methylthio)-1,3,5-triazine-2,4-diamine

The pest repellent tested was naturally-occurring capsaicin (from chili peppers). Many other algaecides, herbicides, bactericides, and pesticides may be used so long as they properly mix with the optically transparent polymers without causing detrimental effects to the polymer's optical, mechanical or chemical properties.

To form one embodiment of this invention, 5-20 weight percent of capsaicin and either 0.1-0.5 weight percent of Irgarol® or 1-4 weight percent of Diuron were added to polymethylmethacrylate (PMMA). These components were first dissolved in dichloromethane to ensure intimate mixing and then solvent cast into polymer sheets by evaporation of the dichloromethane. Extrusion or injection molding could also be used to form the polymer windows or bodies as could other standard polymer processing techniques. The polymer processing steps must not significantly degrade the properties of the antibiofoulant or the polymer.

FIGS. 1 and 2 illustrate a limitation of forming a polymer and an antifoulant to form a coverglass. In this example, capsaicin was mixed with polycarbonate (FIG. 1) or polymethylmethacrylate (FIG. 2). Polymer-mixture sheets were prepared by dissolving 2 g. of poly(bisphenol A) carbonate (Aldrich) or polymethylmethacrylate (Alfa Aesar) into 100 ml. of methylene chloride (Aldrich, used as supplied). The capsaicin (TCI America) was also dissolved in a separate solution of methylene chloride with a ratio of 1 g. capsaicin to 100 ml. of methylene chloride. The capsaicin-loaded polymers were prepared by simply mixing the polymer solutions with the proper amount of capsaicin solution. The solutions were then poured into the mold and the solvent allowed to evaporate at room temperature. Typically, the drying process took about two hours. After drying, the sheets were removed from the molds for testing. These potential coverglasses were approximately 50 µm (0.05 mm) thick and were prepared from 10 ml. of the polymer solution. The as-prepared sheets (~5 cm diameter) were cut into various sizes for testing. Transmission spectra were collected with an Ocean Optics SD2000 UV-Visible spectrometer using a 600 groove/mm grating with a 300 nm blaze wavelength and 25 µm slit. This configuration gives effective spectra over a range from 200 to 850 nm except that a tungsten halogen light source was used, effectively reducing the spectral range from 400 to 850 nm. The doped polymer samples were placed in the filter slot of the spectrometer for optimum repeatable performance. The "percent transmission" or amount of light allowed to pass through the polymer samples was subsequently determined. 100% transmission is effectively passing all of the tested wavelengths of light through the sample; while, 0% transmission is effectively blocking all of the tested wavelengths of light.

FIG. 1 shows optical transmission comparisons for 0 (curve 1), 10% (curve 2) and 20% (curve 3) by weight capsaicin in poly (bisphenol A) carbonate. The rapid reduction in transmission with capsaicin concentration in this polymer prepared by solvent casting makes this composition formed by this method not acceptable for a coverglass. In contrast, capsaicin mixtures formed by the same method in polymethylmethacrylate (PMMA) maintained high transmission up to 20 percent capsaicin, as illustrated in FIG. 2. (Curves 1, 2 and 3 of FIG. 2 represent data for the same concentrations as in FIG. 1.) Therefore, by this method of forming the mixture, PMMA would be an acceptable polymer and the polycarbonate used would not be acceptable. It is believed that other methods of forming the mixture, such as extrusion, will form a solid solution of polycarbonate and capsaicin that will be more transparent. An extruded polycarbonate-algaecide mixture appeared clear, which is believed to be caused by orientation of the polymer molecules in the extruded melt. Tests described here may be employed to determine the suitability of mixtures of polymers and antifoulants formed by different methods for coverglasses. Preferably, percent transmission will be above 70 percent in the visible range or any other range of the spectrum to be detected behind the coverglass.

FIG. 3 illustrates the visible transmission spectrum of a fabricated PMMA sheet with Diuron incorporated into the polymer. Fabrication was by solvent casting as described above. Curves 1-5 represent Diuron concentrations of 0, 0.5, 1, 2 and 4% by weight. There is virtually no loss of transmission due to the algaecide content.

FIG. 4 illustrates the visible transmission spectrum of a fabricated PMMA sheet with Irgarol® 1051 incorporated into the polymer. Fabrication was by solvent casting as described above. Curves 1-3 represent Irgarol® concentrations of 0, 0.25 and 0.5% by weight. There is some loss of transmission in the visible range, but not an excessive amount. Variations in transmission in these experiments were observed to be partly attributable to differences in surface structure (or roughness) of various samples.

To test the antifoulant properties of the capsaicin-loaded PMMA and the mixtures of algaecides and polymers, a marine environment was established. Tests were performed in a salt water environment as opposed to a freshwater environment due to the aggressive growth of salt water plants and animals. The supposition is that if the antifoulant-doped coverglass works in a salt water environment, it will work in a fresh water environment. Using a standard 5-gallon aquarium, the salt water environment was set up using a commercially available sea salt solution (INSTANT OCEAN®). The solution was prepared to have a specific gravity of 1.020-1.023, a pH of ~8.3, and a water temperature of about 27° C. A small aliquot of Chlorella capsulata (a known aggressive biofouling algae) was obtained from the UTEX Culture Collection of Algae and grown in the aquarium. Growth of the algae was further enhanced using an algae growth promoter (KENT PRO-CULTURE). After four weeks of growth, a dense algae growth was present in the aquarium.

PMMA/capsaicin samples of varying capsaicin concentration were prepared as previously described. The samples to be tested were cut into 25×25 mm squares and suspended in the aquarium. To ensure that no location-dependent effects were incorporated into the study, the samples were rotated every few days. The aquarium lights and air system were left running at all times. The samples were left in place for 35 days.

After 35 days, the samples were removed from the tank and rinsed carefully with deionized water to remove any adhering salts. The algae coated samples were then tested for their optical transmission properties using the Ocean Optics SD2000 UV-Vis spectrometer. To properly hold and test the samples, samples wetted with a couple of drops of deionized water were placed in between two standard 1"×3" microscope slides. Results showed that the capsaicin had no effect in decreasing algae growth. In fact, algae grew better on the samples with a higher concentration of capsaicin. Visible transmission measurements showed that the greater the concentration of capsaicin, the greater was the loss of transmission.

Algae growth studies similar to that conducted for the capsaicin-loaded PMMA were then conducted for the Diuron/PMMA and Irgarol®/PMMA samples. The samples were tested similarly to the capsaicin samples for 35 days in the algae tank. A designed experiment was run using a maximum percentage by weight of 4% for the Diuron and 0.5% for the Irgarol® samples. A transmission study of the Diuron samples is shown in FIG. 5. Curve 1 represents transmission of the PMMA containing 2% Diuron after algae growth. Curve 2 represents transmission of PMMA containing 4% Diuron after algae growth. Curve 3 represents transmission of PMMA before algae growth. Curve 4 represents PMMA after algae growth. The data show that although algae had begun to grow on an untreated control sample (Curve 4), there is no sign of algae growth on any of the Diuron samples.

The effective lifetimes of the antifoulant-containing coverglass materials were tested by studying the leaching rate of the algaecides from PMMA substrates in water. The UV absorption bands of Diuron (at 254 nm) and Irgarol® (at 234 nm) were used to detect their presence in aqueous solutions. To study the leaching rate, duplicate samples of the highest concentration of algaecide in PMMA (4% by weight for Diuron and 0.5% for Irgarol®; three samples each) were placed in separate closed containers of ultra-pure deionized water (18 MΩ purity). After 35 days, the concentration of algaecide that had leached into the water was determined by UV spectroscopy using a standard Beer-Lambert law relationship:

$$A = \epsilon l C, \quad (1)$$

Where A is the absorbance of the compound, $\epsilon$ is the extinction coefficient associated with the compound, l is the cell path length, and C is the concentration of the compound. By establishing a suitable set of calibration curves, $\epsilon$ can be calculated from empirical results. A set of calibration curves for both Diuron and Irgarol® was established from $10^{-3}$ M to $10^{-7}$ M in aqueous solution. A Mineral Light Short Wave UV source was used to provide the input light, while the absorption of the samples was collected with the Ocean Optics S2000 previously discussed. Aqueous samples were placed into closed quartz cuvettes for analysis. For the UV measurements the Ocean Optics spectrometer was equipped with a UV transmissive fiber optic cable and spectra collected from 200 nm to 575 nm. Absorbance was measured at the previously mentioned values. A reference sample of ultra-pure deionized water was used for this study.

The study determined that the lower limit of the spectrometer was approximately $10^{-5}$ M concentration for these algaecides. None of the leach test samples showed any absorption; thus, the leach rate is below 1.67 μg cm$^{-2}$ day$^{-1}$ for Diuron and 1.81 μg cm$^{-2}$ day$^{-1}$ for Irgarol®. That compares favorably to the reported leach rate of 4.04 μg cm$^{-2}$ days$^{-1}$ reported for leaching of Irgarol® from marine paints. In addition to these results, no evidence was found of either the Diuron or Irgarol® leaching into test tanks after five months time up to the limit of the spectrometer.

Another preferable property of the coverglasses of this invention is that they have high impact resistance. Although all of the preferred polymers have high impact resistance, the terephthalate copolymer (cis/trans 2,2,4,4-tetramethyl-1,3-cyclobutanediol (CBDO), 1,3-propanediol, and dimethyl-terephthalate) has better impact resistance than the other two polymers discussed and is trademarked as Cycloshield®. The copolyterephthalates can have a glass transition temperature ($T_g$) as low as 80° C. compared to polycarbonate's $T_g$ of 150° C. When prepared to have the maximum impact resistance, the CBDO terephthalate copolymer can have a notched Izod impact resistance of 1070 J/m compared to polycarbonates that range from 650-850 J/m.

Also to be considered regarding plastic coverglass materials in a harsh marine environment is the resistance of the CBDO terephthalate copolymers (or any other polymers) to UV degradation. Accelerated UV aging of Cycloshield® compared to a standard unstabilized polycarbonate showed the transmission of the Cycloshield® compound decreased by 10% while the polycarbonate sample exhibited a 17% decrease in transmission. It is understood in the prior art that UV-stabilizing agents can be added to all of the preferred polymers to further enhance their resistance to UV aging.

It is anticipated that the antibiofoulants will diffuse over time to the surface of a polymer body and leach out of the polymer. Diffusion through the polymer will provide a long-lived protective coating. Because of the relative inertness of the polymeric compounds, they are not expected to form bound complexes with the antifoulants used.

One preferred method for forming the mixtures of polymers and antifoulants is by extrusion. The following procedure may be used to form the solid mixtures: 1) mix together pellets of a transparent, impact resistant polymer and a quantity of acceptable antifoulant powder that will exceed the final desired concentration of the solid solution, 2) process the mixture through an extruder (for example, a Haake Twin Screw Extruder) using standard processing parameters for the polymer, 3) cut the extruded monofilament into pellets for further processing, 4) analyze the parent compound pellets for the percent composition of the antifoulant in the polymer (for example, using proton NMR), 5) reduce the concentration of the parent compound by mixing the parent compound pellets with neat polymer pellets in the proper quantities, 6) process the mixed pellets through the extruder, and 7) pass the molten polymer compound through a heated adjustable slit die to obtain the final polymer sheets.

The decomposition point temperature, or the temperature at which a material burns or decomposes, of the antifoulants must be above the processing temperature of the polymer. As determined by thermal gravimetric analysis, the decomposition point temperatures are 210° C. for capsaicin, 208° C. for Diuron, and 196° C. for Irgarol® 1051. The processing temperatures for melt extrusion are: for PMMA, 125° C.; for CBDO terephthalates (Cycloshield®), 130° C., and for polycarbonate, 190° C. It is expected that the antibiofoulants will be entrained in the polymer matrices. This entrainment is a key to the antifouling properties of the coverglasses or windows as it is the chemical nature of the antibiofoulants that provides the antifouling properties. In a typical matrix with entrained compounds there will always be some of these compounds exposed at the surface. Further, depending on the nature of the matrix, there will also be some diffusion rate of the compounds throughout the material.

Although the present invention has been described with reference to specific details, it is not intended that such details should be regarded as limitations on the scope of the invention, except as and to the extent that they are included in the accompanying claims.

I claim:

1. A transparent polymer body, comprising:
   a polymer; and
   one or more organic compounds having antifoulant properties dispersed in the polymer to form a solid body, the body having a transmission of visible light greater than 70 percent, and wherein the Notched Izod impact resistance of the polymer is at least 650 J/m.

2. The polymer body of claim 1 wherein the polymer is a polycarbonate.

3. The polymer body of claim 1 wherein the polymer is a terephthalate copolymer.

4. The polymer body of claim 1 wherein the Organic compounds having antifoulant properties are selected from compounds consisting of algaecides, herbicides, bactericides, and pesticides.

5. The polymer body of claim 4 wherein the organic compound is Diuron or Irgarol® 1051.

6. A method for forming a solid polymer-antifoulant mixture having a selected concentration Of antifoulant, comprising:
   providing the polymer;
   providing the antifoulant;
   dissolving the polymer and the antifoulant in a solvent to form selected concentrations of polymer solution and antifoulant solution;
   mixing the polymer solution and the antifoulant solution at a selected ratio to form a solution of the polymer-antifoulant mixture having the selected concentration of antifoulant; and
   removing the solvent to form the solid mixture.

7. A method for forming a solid polymer-antifoulant mixture comprising:
   providing measured amounts of solid polymer, the solid polymer having a processing temperature, and antifoulant, the antifoulant having a decomposition temperature, the decomposition temperature being higher than the processing temperature;

mixing the measured amounts of the solid polymer and the antifoulant; and passing the mixture of solid polymer and antifoulant through an extruder operating at the processing temperature.

8. The method of claim 7 wherein the extruder includes a die to form a monofilament of the mixture and further comprising the step of cutting the monofilament into pellets.

9. The method of claim 8 further comprising the step of analyzing the pellets to determine a concentration of antifoulant in the solid polymer 10. The method of claim 9 further comprising mixing pellets of step 11 with pellets of step 10 and passing the mixture of pellets through an extruder.

11. The method of claim 10 wherein the extruder includes a die having a selected shape.

12. A transparent polymer body, comprising:

a polymer; and one or more organic compounds having antifoulant properties dispersed in the polymer to form a solid body, the body having a transmission of visible light greater than 70 percent, wherein the polymer is a polymethylmethacrylate.

13. A transparent polymer body, comprising:

a polymer; and one or more organic compounds having antifoulant properties dispersed in the polymer to form a solid body, the body having a transmission of visible light greater than 70 percent, wherein the one or more organic compounds is a pesticide comprising capsaicin.

14. A coverglass comprising:

a transparent polymer body, the transparent polymer body comprising:

a polymer; and one or more organic compounds having antifoulant properties dispersed in the polymer to form a solid body, the body having a transmission of visible light greater than 70 percent.

* * * * *